United States Patent [19]

Carrano et al.

[11] Patent Number: 5,049,270

[45] Date of Patent: Sep. 17, 1991

[54] FILTER APPARATUS HAVING LIQUID CONTROL MECHANISM

[75] Inventors: Thomas P. Carrano, Fairfield; Raymond M. Petrucci, Middlebury, both of Conn.

[73] Assignee: Cuno, Inc., Meriden, Conn.

[21] Appl. No.: 405,539

[22] Filed: Sep. 7, 1989

[51] Int. Cl.$^5$ .......................... B01D 27/00; B67D 5/00
[52] U.S. Cl. ....:.................................. 210/248; 141/35; 141/212; 141/248; 210/121; 210/282; 210/323.1; 210/335; 222/67
[58] Field of Search ................. 210/97, 121, 143, 282, 210/323.1, 335, 340, 341, 248, 252, 255, 257.1; 222/56, 65, 67, 189; 141/35, 196, 212, 229, 248

[56] References Cited

U.S. PATENT DOCUMENTS

| | | | |
|---|---|---|---|
| 575,172 | 1/1897 | Rossbach-Rousset | 141/196 |
| 1,081,982 | 12/1913 | Patton | 141/196 |
| 1,950,682 | 3/1934 | Malsbary | 141/248 |
| 2,670,889 | 3/1954 | Heckendorf | 141/35 |
| 2,886,071 | 5/1959 | Rasmussen | 141/248 |
| 3,950,253 | 4/1976 | Stern | 210/282 |
| 4,258,758 | 3/1981 | Nygards | 141/35 |
| 4,312,754 | 1/1982 | LaFontaine | 210/282 |
| 4,683,054 | 7/1987 | Turnbull | 210/282 |
| 4,735,716 | 4/1988 | Petrucci et al. | 210/232 |
| 4,880,535 | 11/1989 | Burrows | 210/255 |

Primary Examiner—Jay H. Woo
Assistant Examiner—James P. Mackey
Attorney, Agent, or Firm—Renner, Kenner, Greive, Bobak, Taylor & Weber

[57] ABSTRACT

A filter apparatus is used to filter tap water and to automatically fill two containers. This apparatus includes a filter subassembly, a housing subassembly, a water control subassembly, and first and second containers. The water control subassembly includes a center see-saw chute receiving filtered water from a supply line from the filter subassembly, and includes a left pivoted chute and a right pivoted chute, each receiving a selectively directed water stream from the center chute. Each pivoted chute has a float at one end thereof, in contact with the water in its respective container when about full. An upward force from its container water pivots each left and right chute, when the container is about full, causing the respective water stream to be redirected in the opposite direction along its chute to a reservoir and drain line. In a preferred embodiment, first chute has a cam surface, which bears against a surface on the center chute, thereby pivoting the center chute, and redirecting the water stream to the right chute.

10 Claims, 9 Drawing Sheets

FILTER APPARATUS HAVING LIQUID CONTROL MECHANISM

BACKGROUND OF THE INVENTION

1. Field of the Invention

This invention relates to a filter apparatus having a liquid control mechanism, and in particular the invention relates to a filter apparatus having a liquid control mechanism for automatically filling containers.

2. Prior Art

Prior art filter or water purification apparatus have a filter subassembly, a housing subassembly which supports the filter subassembly, a container supported by the housing subassembly, and a faucet for filling the container.

One problem with such an apparatus is that a user has to manually operate the faucet for filling the container. Another problem is that a user must wait until the container is filled, and then must shut the faucet off to prevent overflow.

U.S. Pat. No. 4,735,716, to Petrucci, et al. describes a known prior art filter subassembly, as indicated hereafter.

Co-pending United States design applications, now patented, which show ornamental features of some embodiments shown and described herein, include U.S. Pat. No. Des. 313,642, entitled "Countertop Home Water Purifier (Model 1)", and U.S. Pat. No. Des 311,766, entitled "Countertop Home Water Purifier (Model 2)", and U.S. Pat. No. Des. 312,679, entitled "Countertop Home Water Purifier (Model 3)".

SUMMARY OF INVENTION

According to the present invention, a filter apparatus is provided. This filter apparatus includes a filter subassembly for filtering a liquid, i.e. water, a housing subassembly for supporting the filter subassembly, two containers which are automatically filled with liquid, and a fluid control subassembly which meters out liquid and fills the containers in sequence.

The fluid control subassembly of this invention solves the problem of having a user manually operate the liquid supply, wait until the reservoir is filled and then shut off the liquid supply.

The foregoing and other objects, features, and advantages will be apparent from the following description of the preferred embodiments of the invention as illustrated in the accompanying drawings.

DESCRIPTION OF THE PREFERRED EMBODIMENT

As shown in FIGS. 1, 2, 3 and 4, water supply or filter apparatus 20 is provided for filtering, dispensing, metering and storing filtered water for both residential and commercial use alike. For example, apparatus 20 can be connected to a sink faucet in a home or restaurant.

Figure 1:
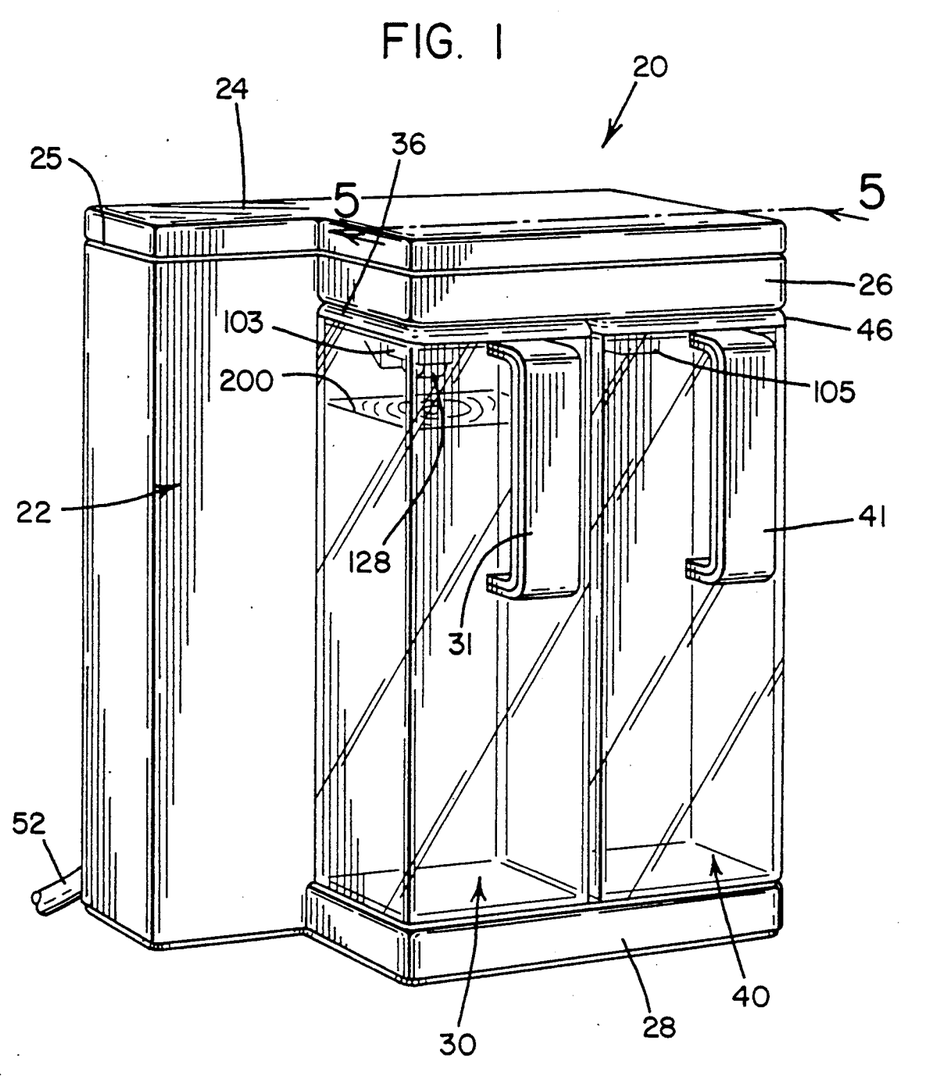
FIG. 1 is a perspective view of an embodiment of the apparatus according to the invention as viewed from the front thereof.
Figure 2:
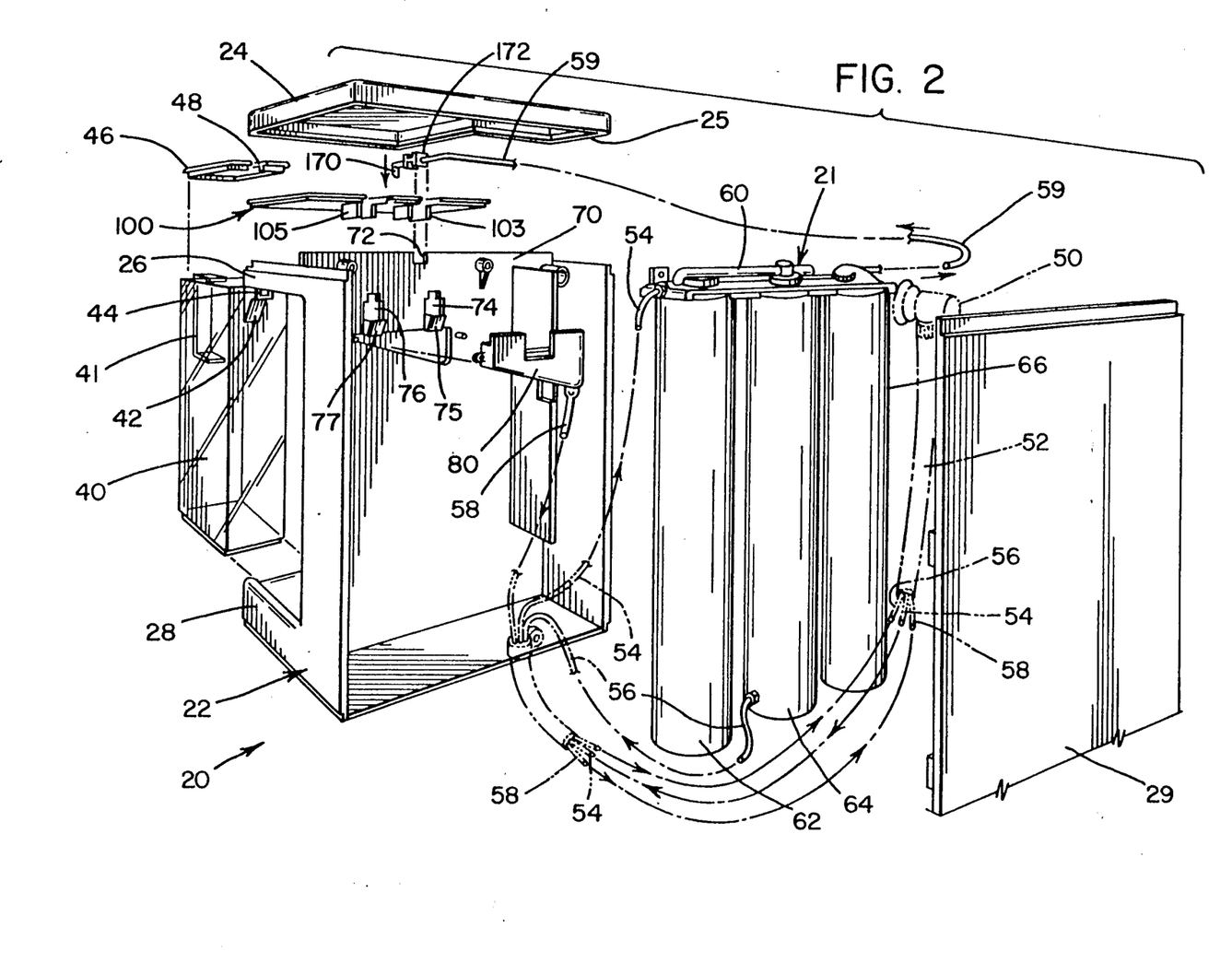
FIG. 2 is an exploded view of the apparatus of FIG. 1 as viewed from the rear thereof.
Figure 3:
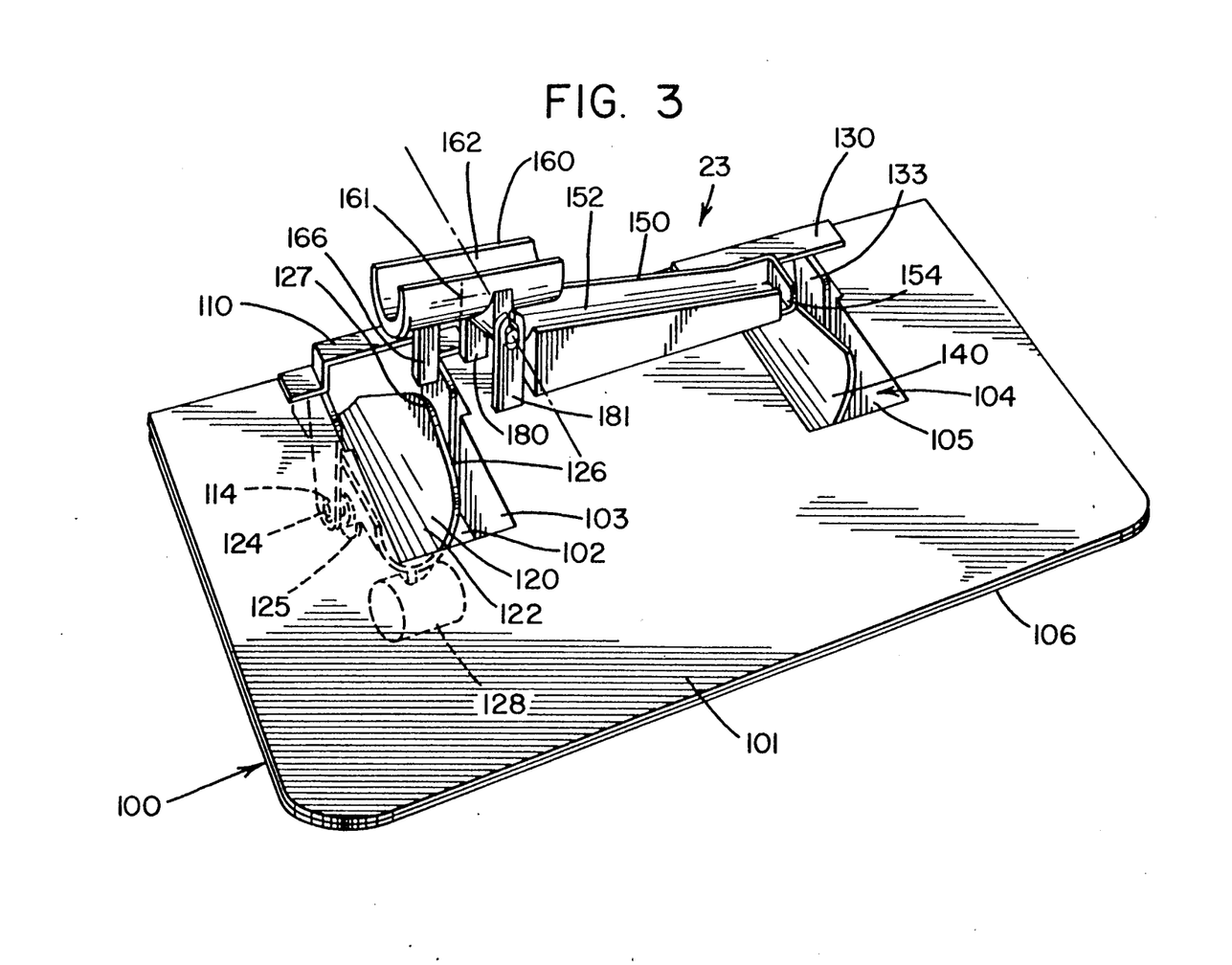
FIG. 3 is a perspective view of a portion of the apparatus.

Apparatus 20 includes a filter subassembly 21 (FIG. 2) for filtering and/or purifying water, or other liquids, a housing subassembly 22 (FIGS. 1 and 2) for supporting the filter subassembly 21, and a fluid control subassembly 23 (as best shown in FIG. 3).

As used herein, the term "filter" or "filtering" includes not only filtration as that term is ordinarily used, but reverse osmosis ultrafiltration type purification of water. Thus the use of the term "filter cartridge" may include a reverse osmosis cartridge.

As shown in FIG. 2, housing subassembly 22 has a removable top lid 24 with an assembly joint 25 which rests on a top wall extension portion 26. Housing subassembly 22 also has a bottom wall extension 28 for supporting water containers 30 and 40 (FIG. 1), and has a removable rear door 29.

Figure 5:
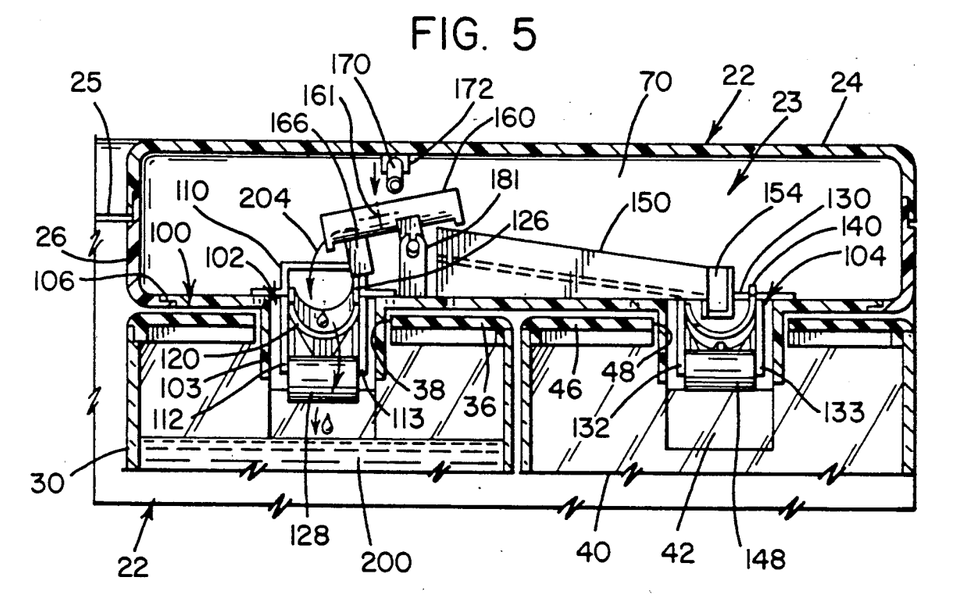
FIG. 5 is a partial cutaway view of the apparatus as taken along line 5—5 of FIG. 1.

As best shown in FIG. 1, the left container 30 has a left handle 31, and the right container 40 has a right handle 41. As also shown from a rear view in FIG. 2, right container 40 has a rear tapered wall portion 42 with an opening 44. Left container 30 also has a rear tapered wall portion with an opening (not shown). Left container 30 is substantially identical to right container 40. As best shown in FIG. 5, left container 30 has a left lid 36, which has a cutout 38 and right container 40 has a right lid 46, which has a cutout 48.

As shown in FIG. 2, filter subassembly 21 includes a faucet connector 50 which connects to a multi-line conduit 52. Conduit 52 has a inlet water line 54 for unfiltered water, an effluent discharge line 56 which can also be used for reverse flushing when required and a drain line 58. An outlet water line 59 is provided which is a supply line of filtered water to the fluid control subassembly 23.

In the operation of filter subassembly 21, water flows through inlet line 54 and into structure 60, then through first cartridge 62 and back through structure 60, then through second cartridge 64 and back through structure 60, then through third cartridge 66 and out through outlet line 59.

Figure 9:
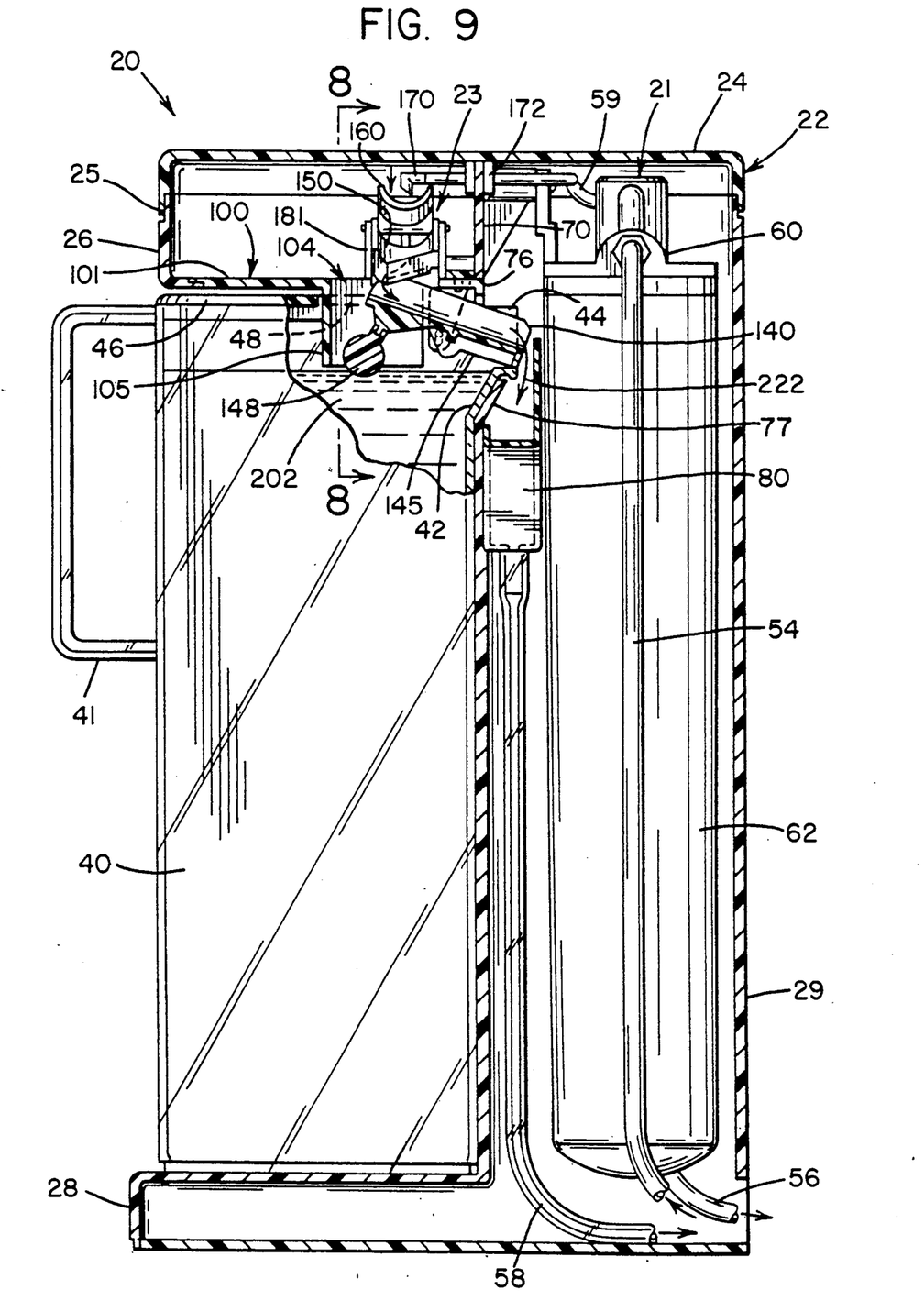
FIG. 9 is a section view as taken along line 9—9 of FIG. 8.

As shown in FIG. 2 and 9, housing subassembly 22 has a main support wall 70 with a notch 72 for receiving outlet water line 59. Main wall 70 has an opening 74, disposed above a tapered wall portion 75, and another opening 76, disposed above tapered wall portion 77. Openings 74, 76 receive respective water delivery chutes as described hereafter. Tapered wall portion 75 receives a respective container tapered wall portion (not shown) of container 30, and tapered wall portion 77 receives a respective container tapered wall portion 42 of container 40. Main wall 70 supports a reservoir unit 80 which connects to drain line 58.

Figure 4:
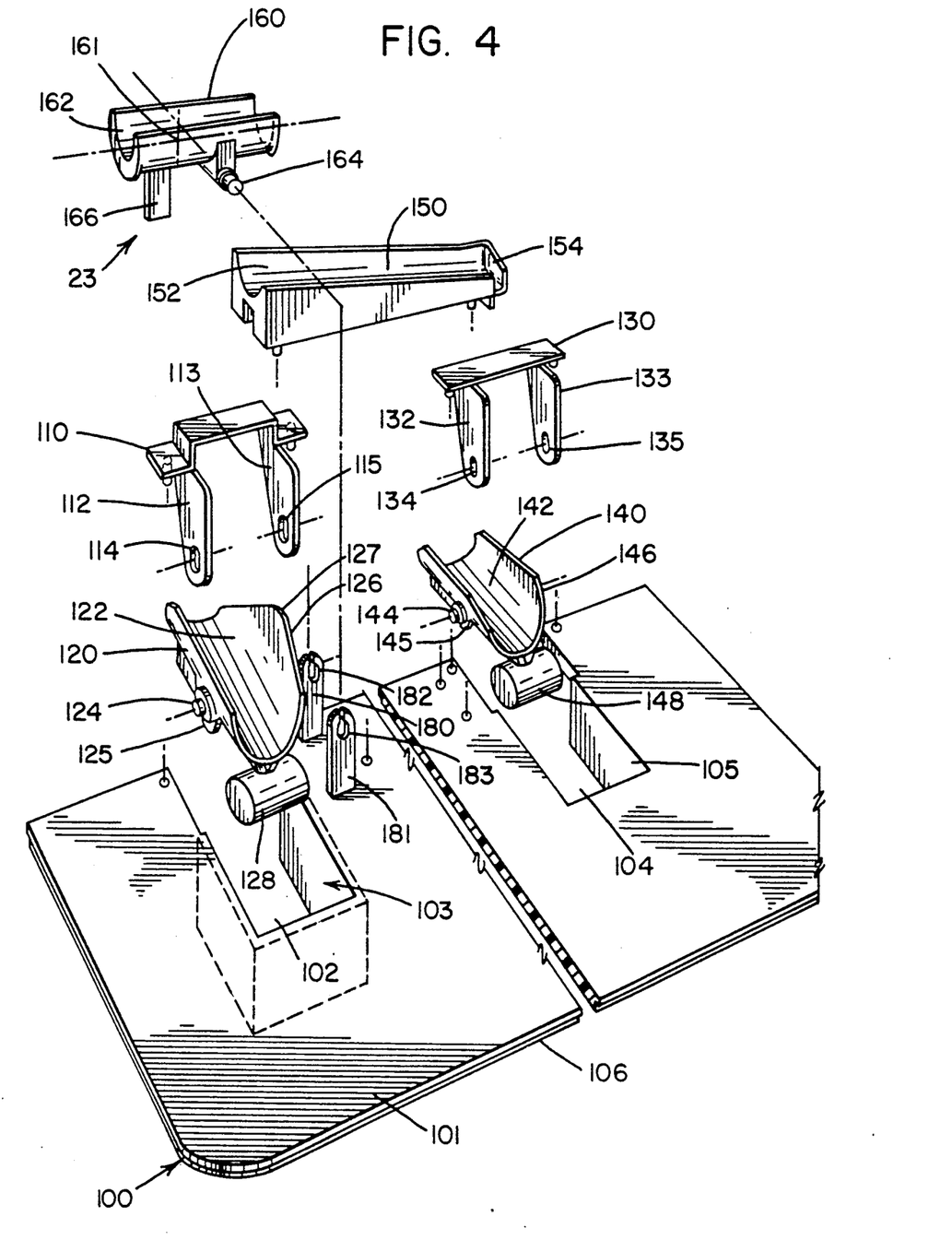
FIG. 4 is an exploded perspective view of the portion shown in FIG. 3.
Figure 6:
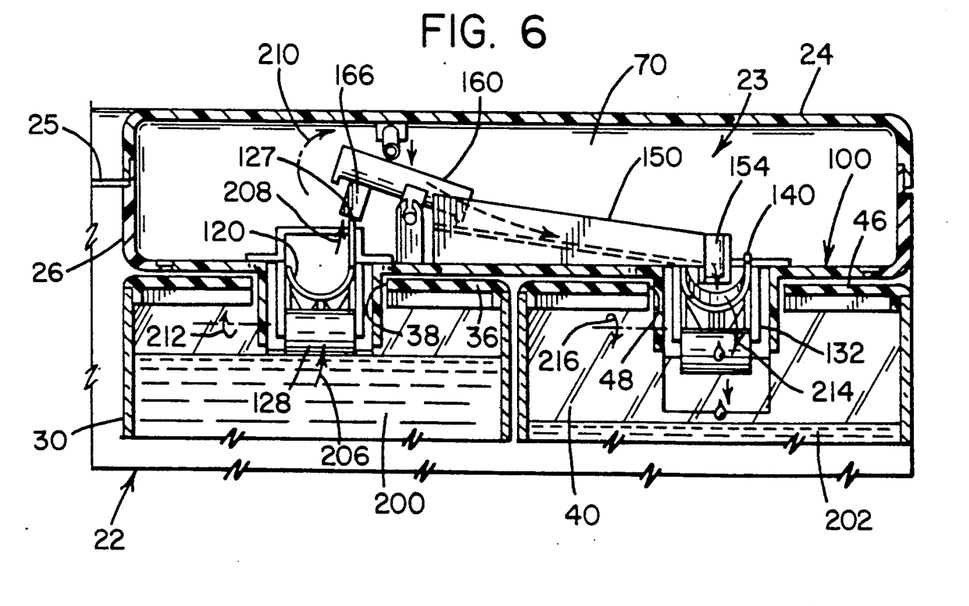
FIG. 6 is a view corresponding to the view of FIG. 5 but at a subsequent operating stage.

As shown in FIGS. 3 through 8, and particularly FIGS. 3 and 4, fluid control subassembly 23 includes a removable top tray 100 with an upper surface 101, which rests on housing subassembly 22. Tray 100 has a left cutout 102 with a suspended wall 103 for minimizing splashing and splashing noises of flowing liquids, and a right cutout 104 with a suspended wall 105. Tray 100 also has an assembly joint 106 (FIG. 6).

As best shown in FIG. 4, control subassembly 23 includes a left support bracket 110 with first and second plates 112, 113. Plates 112, 113 have respective pivot apertures 114, 115. Control subassembly 23 includes a left chute 120 with an inner surface 122 and a pivot shaft 124. Pivot shaft 124 is frictionally journalled in apertures 114, 115. Chute 120 has a camming or cam surface 126 with a peak point 127. Chute 120 also has a float 128 at its front end.

As shown in FIGS. 4 and 5, control subassembly 23 includes a right support bracket 130 with first and second plates 132, 133. Plates 132, 133 also have respective pivot apertures 134, 135. Control subassembly 23 also includes a right chute 140 with an inner surface 142, and has a pivot shaft 144 near one end thereof. Chute 140 has a splash-proof extended wall portion 146. Chute 140 also has a float 148 at its front end.

As best shown in FIGS. 3 and 4, control subassembly 23 also includes a ramp chute 150 with an inner surface 152 and an outlet 154. Control subassembly 23, also has a see-saw or biasing chute 160, which has a predetermined center of gravity 161. Chute 160 is frictionally journalled on shaft 164 so that it can be biased upward by the force of peak point 127 and it can be unbiased downward by the removal of that force. Center of gravity 161 is to the left of the shaft as shown schematically in FIG. 5 and is near to a longitudinal centerline of symmetry of chute 160. Chute 160 has a post or actuator tab 166, which coacts with cam surface 126.

As shown in FIG. 4, control subassembly 23 also has rear front posts 180, 181 with pivot holes 182, 183 respectively which support pivot shaft 164.

As shown in FIGS. 2 and 5, a water supply 170 is supported by a grommet ring 172, which is disposed in notch 72 of wall 70.

Sequential stages of operation are shown respectively in FIGS. 5, 6, 7 and 8.

As shown in FIG. 5, the right container 40 is empty, and the left container is partially filled. Thus floats 128 and 148 are biased downwardly (as will be further explained herein), biasing chute 160 is biased left and a water stream 204 flows from inlet 170, flows along chute surface 162, then flows along chute 120 and empties into container 30.

When container 30 is filled as shown in FIG. 6, water represented by label 200 applies an upward force 206 to float 128, and urged to pivot in direction 212, causing cam surface 126 to apply an upward force 208 to post 166, thereby causing chute 160 to pivot in a clockwise direction 210. A water stream 214 then flows along ramp chute 150, flows through outlet 154, and empties into right container 40. Right chute 140 is urged to pivot in direction 216 (as will be explained herein).

Figure 7:
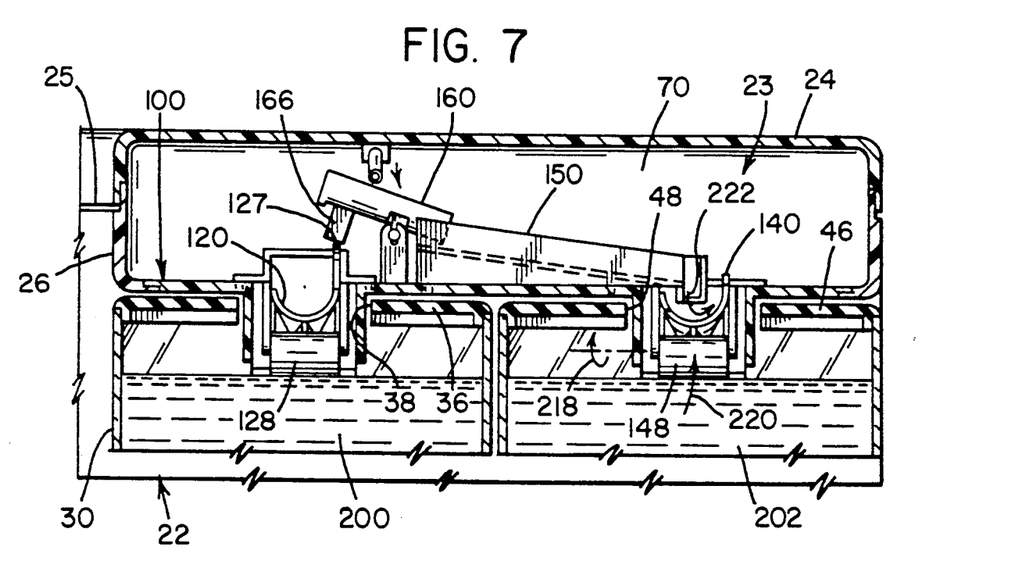
FIG. 7 is a view corresponding to the view of FIG. 6 but at a subsequent operation stage.

When the right container 30 is also filled, as shown in FIG. 7, water 202 applies an upward force to right float 148 and is urged to pivot in direction 218.

As shown in both FIGS. 7 and 9, when left chute 120 is urged upwardly by water force 206, and simultaneously right chute 140 is urged upwardly by water force 220, a water stream 222 flows to the rear of the chute 140, and flows through opening 76 (FIG. 9), and flows into reservoir 80 and out through drain line 58.

If a user removes either container 30 or 40 when full, chutes 120 and 140 remain frictionally journalled in their upwardly biased conditions, or are further biased upward by the rear tapered wall portion of the respective container.

Figure 8:
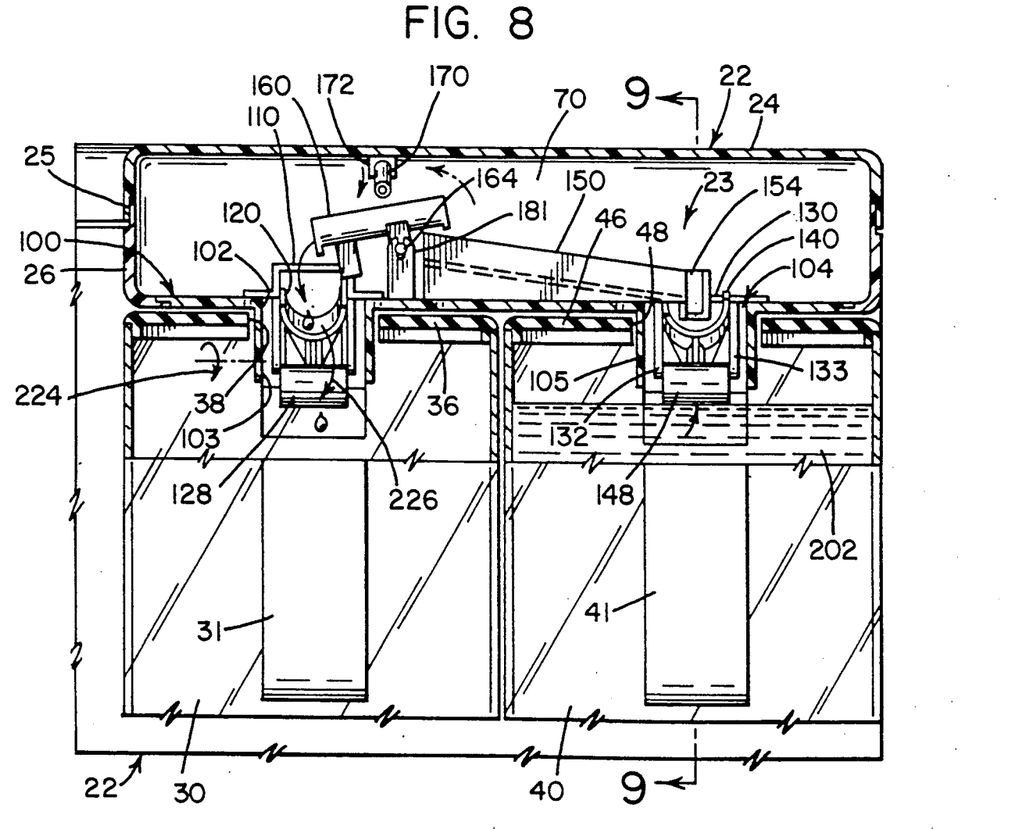
FIG. 8 is a view as taken along line 8—8 of FIG. 9 and corresponding to the view of FIG. 7 but at a subsequent operating stage.

After left container 30 is emptied by a user and replaced, as shown in FIG. 8, its left rear tapered wall portions (not shown, but see FIG. 2, right tapered wall portion 42) urges left rear fins 125 (or right rear fin 145 for right portion 42) backwards and redirects the flow of the water of chute 120 back into container 30. Now water flows on inner surface 122, causing downward force on float 128. Thus chute 120 is pivoted in direction 224 by the applied force of the contained rear wall. The left container will now start to fill again regardless of how full the right container may be at the time, so that a water stream 226 now flows from at inlet 170, then flows along chute 162, then flows along chute 120, and then empties into container 30. During filling, stream 226 continues to apply a force against chute 120 in direction 224 to keep it biased downwardly.

In FIG. 8, when removing a container 30 or 40 when full, its respective float 128 or 148 has been urged upwardly by the rear container wall, and stays upwardly to redirect water flow and assure fluid flow to reservoir 80. Note that, as one skilled in the art would appreciate, the weight biasing chute 160 should be light enough so that float 128 is not urged downward upon removal of the container. When the container 30 or 40 is reinserted, its float 128 or 148 is again urged downward as described above.

Figure 10:
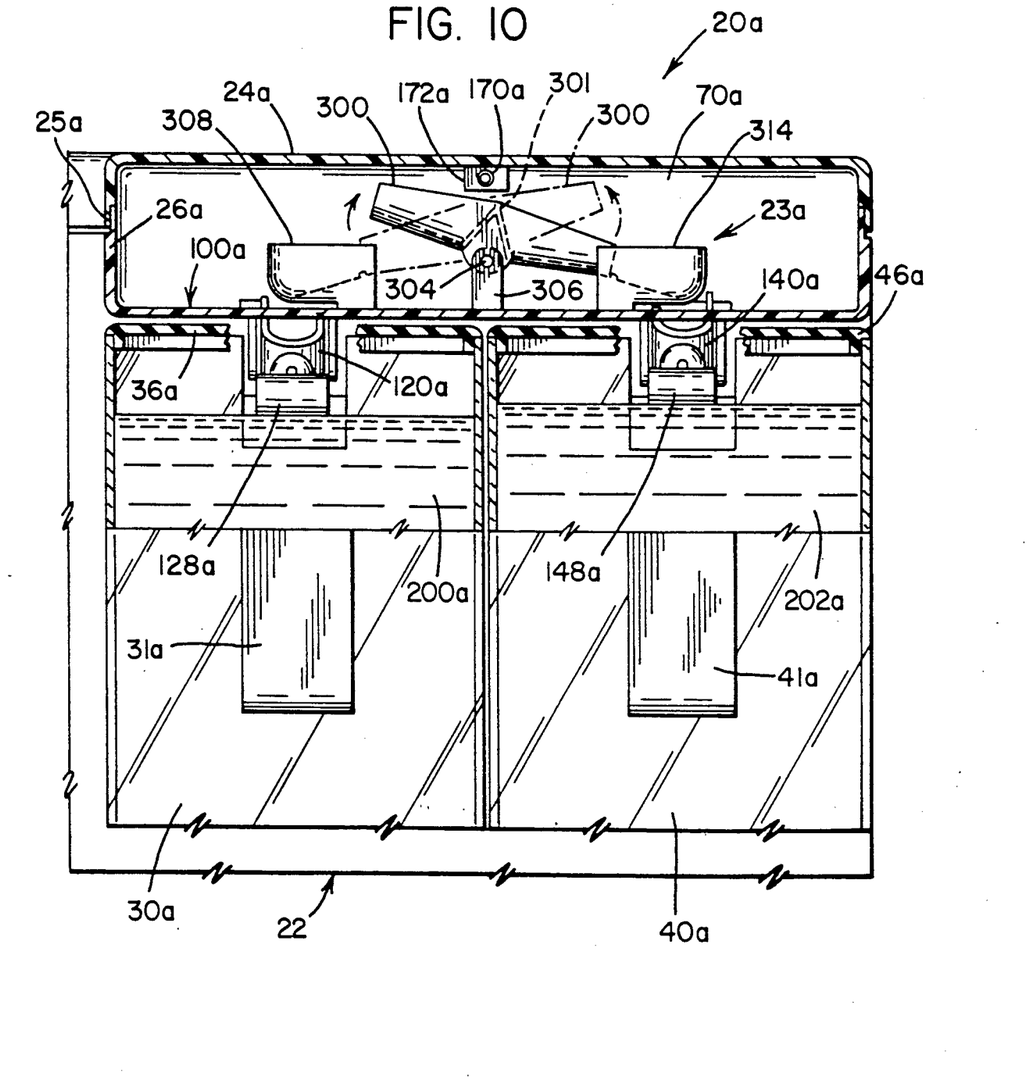
FIG. 10 is a partial cutaway view of a second embodiment of the apparatus according to the invention.
Figure 11:
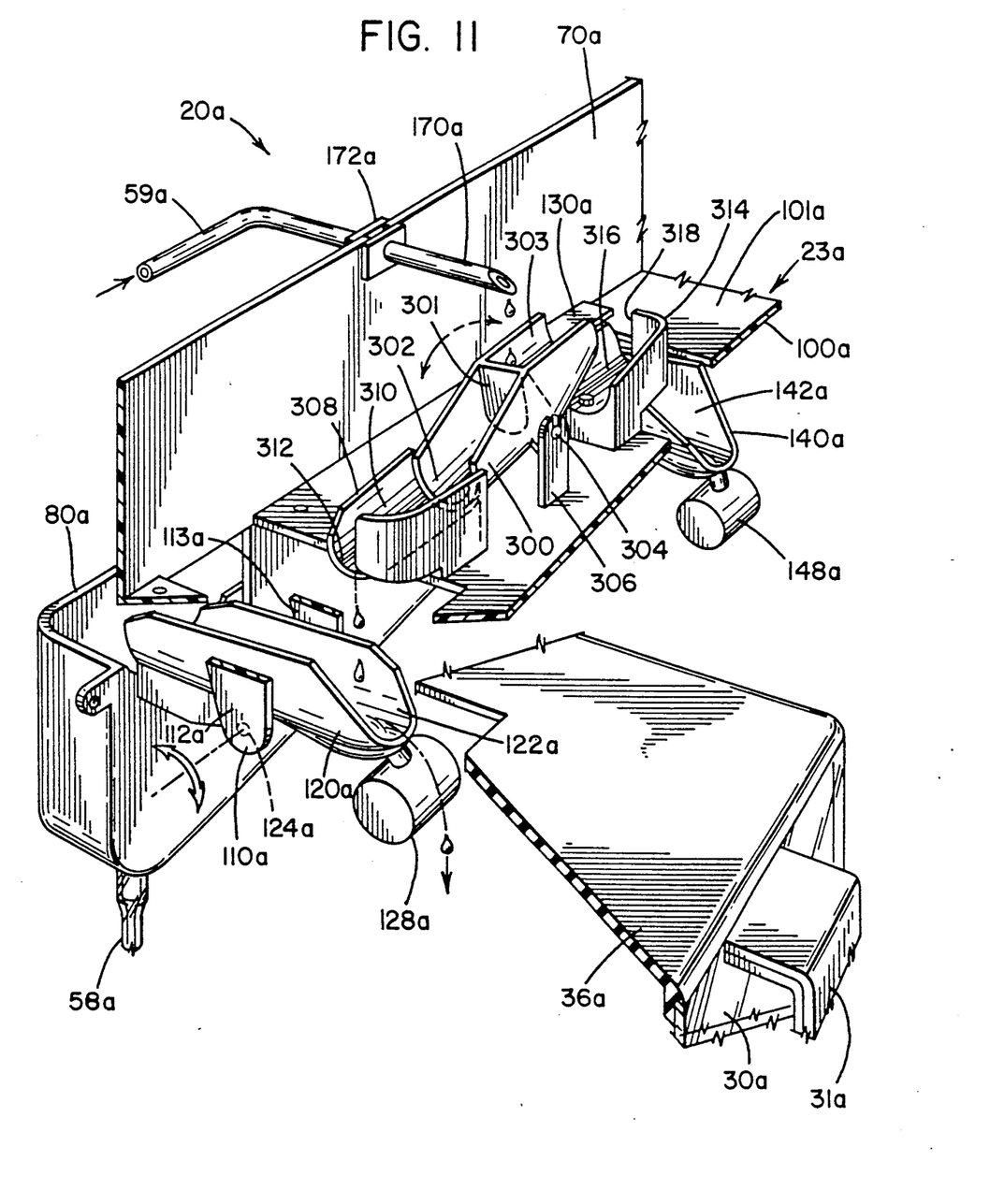
FIG. 11 is a partial perspective view of a portion of the second embodiment of FIG. 10.

A second embodiment 20a of this invention is shown in FIGS. 10 and 11. Parts of the second embodiment 20a, which are the same as like parts of the first embodiment 20, have the same numerals but with a subscript "a" added thereto. In the second embodiment, the left and right containers 30a and 40a fill at substantially the same rate.

Apparatus 20a includes a filter subassembly (not shown), a housing subassembly 22a, and a fluid control subassembly 23a.

Housing subassembly 22a has a top lid 24a, and an assembly joint 25a, and a top portion 26a. Left and right containers 30a, 40a have respectively handles 31a, 41a and lids 36a, 46a.

Filter subassembly (not shown but which is partly shown and which has the same construction as the filter subassembly of the first embodiment) has a drain line 58a for overflow water and a supply line 59a for filtered water.

Housing subassembly 22a has a main support wall 70a, which supports a reservoir unit 80a, that connects to drain line 58a.

Control subassembly 23a has a top tray 100a with a upper surface 101a, which has a first plate 112a and a second plate on bracket assembly 110a. Control subassembly 23a also has a left chute 120a, which has a inner surface 122a. Chute 120a has a pivot shaft 124a and a float 128a. Control subassembly 23a also has a right chute 140a, which has an inner surface 142a and mounted on bracket assembly 130a. Chute 140a has a float 148a.

Wall 70a supports a water inlet 170a, which has a grommet ring 172a. Container 40a contains fluid or water 202a.

As shown in FIG. 11, a see-saw dual chute 300 is provided. Chute 300 has a center wall 301. Chute 300 also has a left inner surface 302, and a right inner surface 303, and a pivot shaft 304. Shaft 304 is mounted on a near post 306 and a far post (not shown).

Chute 300 alternately flows into left fixed chute 308 which has an inner surface 310 and an end opening 312, or flows into a right fixed chute 314, which has an inner surface 316 and an end opening 318.

In operation, as shown in FIG. 11, water alternately drips or flows to left surface 302 or to right surface 303 from outlet 170a, like a pendulum. A left water stream passes over left surface 302 to chute 308, then passes through opening 312 in to chute 120a, and then passes into water 200a of container 30a. An alternate right stream passes over right surface 303 to chute 314, then passes through opening 318 into chute 140a, and then passes into water 202a of container 40a.

Upon filling a container 30a or 40a, its float 128a or 148a applies an upward force on its respective chute 120a or 140a, thereby stopping flow of water into container 30a or 40a. Water from outlet 170a passes to the rear of chute 120a or 140a, and then flows into reservoir 80a, from which the water flows into drain line 58a.

With embodiment 20a, containers 30a, 40a are filled simultaneously, rather that in sequence.

The advantage of apparatus 20 and 20a are:

(a) The problem of manual operation by a user of a supply faucet is avoided;

(b) The problem of waiting by a user for the filling of a container is avoided;

(c) The problem to a user of manually shutting off the water faucet after each use is avoided;

(d) Fluid control subassembly 23 allows a user to fill a first container 30; and when its float 128 stops the filling of the first container 30, it will redirect the flow to a second container 40; and when the second container 40 is filled, it will redirect the flow to a reservoir 80 with a drain line 58;

(e) If a full container 30 is removed, and is placed by an empty container 30, fluid control subassembly 23 will start refilling empty container 30 immediately or right after container 30 immediately or right after container 40 is filled up;

(f) Second embodiment 20a also distributes filter water to two containers 30a, 40a in approximately equal amounts alternately, so that containers 30a, 40a fill up simultaneously;

(g) Tray 100 is disassembled easily to facilitate cleaning of tray 100 and flow control subassembly 23;

(h) Accidental overflow of fluid 200 or 202 from container 30 or 40 is prevented, by the reduction of flow in chute 120 or 140 to reservoir 80 with drain line 58;

While the invention has been described in the preferred embodiment, it is to be understood that the words which have been used are words of description rather that limitation and that changes may be made within the purview of the appended claims without departing from the true scope and spirit of the invention in its broader aspects.

The embodiments of an invention in which an exclusive property or right is claimed are defined as follows:

1. A filter apparatus comprising:
   a filter subassembly for filtering water having a water outlet line;
   a housing subassembly for supporting and enclosing the filter subassembly;
   at least a first and second container for receiving and holding the filtered water; and
   a water control subassembly for controlling and metering the water to the containers; said water control subassembly comprising
      a top support tray supported by the housing subassembly and disposed below the water outlet line;
      a first pivoted chute pivotally supported by the tray and having a first float at one end thereof for contact with water in the first container when about full;
      a second pivoted chute pivotally supported by the tray and having a second float at one end thereof for contact with water in the second container when about full;
      a center chute disposed between the first and second pivoted chutes and pivotally supported by the tray for providing first and second selected water streams to the first and second pivoted chutes, respectively, from the water outlet line; and
      a drain reservoir with a drain line for water overflow.

2. The apparatus of claim 1, wherein the housing subassembly comprises:
   a main support wall;
   a bottom extension portion for supporting the containers;
   a top extension portion for covering the containers;
   a top lid for covering the main support wall and the top extension portion and the filter subassembly; and
   a rear door for enclosing the filter subassembly.

3. The apparatus of claim 1, wherein the filter subassembly includes:
   a multi-line conduit having a water connector;
   said multi-line conduit having an inlet water line and an effluent discharge line and a drain line and an outlet line for filtered water;
   a triple head structure mounted on the housing subassembly;
   a first filter cartridge connected to the inlet water line and suspended from the triple head structure;
   a second filter cartridge connected to the effluent discharge line and suspended from the triple head structure; and
   a third filter cartridge connected to the outlet line and supported from the triple head structure.

4. The apparatus of claim 1, wherein the first pivoted chute has a cam surface and the center chute has a surface engaging said cam surface, whereby an upward force from water in the first container when about full acting on the first float causes a pivoting of the first chute and whereby the cam surface causes a pivoting of the center chute and a stopping of the first water stream to the first chute and a starting of the second water stream to the second chute for filling the second container and whereby a second upward force from water in the second container when about full acting on the second float causes a pivoting of the second chute thereby redirecting the second water stream to the drain reservoir.

5. The apparatus of claim 1, including a first fixed ramp chute disposed between the first pivoted chute and the center chute, and including a second fixed ramp chute disposed between the second pivoted chute and the center chute, for simultaneously providing the first and second water streams, each of the first and second pivoted chutes being communicable with the drain reservoir to redirect the associated water stream thereto when the associated container is about full.

6. A water dispenser comprising:

filter means for filtering water;

housing means for enclosing the filter means;

first and second containers to be filled with filtered water; and control means provided above the first and second containers and supported by said housing means for filling each container automatically to a selected level, said control means comprising a first pivoted chute having a first float at one end thereof for contact with water in the first container when about full;

a second pivoted chute having a second float at one end thereof for contact with water in the second container when about full;

a center chute pivotally disposed between the first pivoted chute and the second pivoted chute for providing first and second selected water streams to the first pivoted chute and the second pivoted chute, respectively, from the filter means; and a drain reservoir with a drain line for water overflow.

7. A water filter comprising:

means for purifying water;

means for feeding the purified water to a plurality of containers;

means for distributing the purified water to said plurality of containers, said distributing means comprising:

first pivotal means for feeding the purified water to one of said plurality of containers until said one container is filled;

first means for ceasing the feeding of the purified water to said one container;

second pivotal means for feeding the purified water to another one of said plurality of containers until it is filled;

second means for ceasing the feeding of the purified water to said another one of said plurality of containers; and third means for sequentially feeding the purified water to the first and second means for feeding until said containers are filled, and pivotally positioned therebetween.

8. A water filter as claimed in claim 7, wherein said distributing means further comprises:

means for collecting an overflow of said purified water when said plurality of containers are filled.

9. A water filter comprising:

means for purifying water;

means for feeding the purified water to a plurality of containers;

means for distributing the purified water to said plurality of containers, said distributing means comprising:

first means for feeding the purified water to one of said plurality of containers until said one container is filled;

first means for ceasing the feeding of the purified water to said one container;

second means for feeding the purified water to another one of said plurality of containers until it is filled;

second means for ceasing the feeding of the purified water to said another one of said plurality of containers;

third means for feeding the purified water to the first and second means for feeding, and positioned therebetween;

a first fixed ramp chute disposed between the first and third means for feeding; and, a second fixed ramp chute disposed between the second and third means for feeding, said third means simultaneously providing the purified water to said plurality of containers until said containers are filled.

10. A water filter as claimed in claim 9, wherein said distributing means further comprises:

means for collecting an overflow of said purified water when said plurality of containers are filled.

* * * * *